United States Patent [19]

Grimes

[11] Patent Number: 4,611,097

[45] Date of Patent: Sep. 9, 1986

[54] SINE WAVE RING GENERATOR

[75] Inventor: Mark W. Grimes, Lombard, Ill.

[73] Assignee: Rockwell International, Downers Grove, Ill.

[21] Appl. No.: 620,359

[22] Filed: Jun. 13, 1984

[51] Int. Cl.[4] .................. H04M 5/00; H03K 5/156
[52] U.S. Cl. .................. 179/84 A; 179/84 VF; 363/97; 307/261
[58] Field of Search .............. 323/266; 363/26, 56, 363/89, 97; 340/384 E; 179/84 A, 84 VF, 84 T, 84 R, 51 AA, 18 HB; 307/261; 84/DIG. 9

[56] References Cited

U.S. PATENT DOCUMENTS

| | | | |
|---|---|---|---|
| 3,982,189 | 9/1976 | Brooks et al. | 307/261 X |
| 4,220,826 | 9/1980 | Kiss | 179/18 HB X |
| 4,239,935 | 12/1980 | Bosik et al. | 179/84 R |
| 4,239,941 | 12/1980 | Gauthier et al. | 179/84 R |
| 4,456,949 | 6/1984 | Incledon | 363/97 X |
| 4,459,651 | 7/1984 | Fenter | 363/97 X |

Primary Examiner—James L. Dwyer
Attorney, Agent, or Firm—C. B. Patti; V. L. Sewell; H. Fredrick Hamann

[57] ABSTRACT

This invention depicts a novel sine wave ring generator for use with a telephone circuit and an input voltage having a predetermined range, the generator comprising a switching power supply for providing a pre-determined DC output voltage from the input voltage range, an oscillator for providing a pseudo-sine wave output with a predetermined frequency, and an amplifier for amplifying the pseudo-sine wave and for receiving the predetermined DC voltage having a low output impedance thereby maintaining regulation of a circuit output voltage in a predetermined range and supplying a circuit output current.

5 Claims, 3 Drawing Figures 4,611,097

SINE WAVE RING GENERATOR

BACKGROUND OF THE INVENTION

This invention relates to telephone supervisory control circuits and more particularly to ring controlled circuits.

Numerous circuits are known in the prior art for generating a ring voltage and a telephone circuit. The U.S. Pat. No. 4,239,935 issued to Bosik et al. discloses a ring generator which uses trapezoidal shaped ringing signals to reduce cross-talk and interference. Current limiting is provided only for that part of the circuit connected to the subscriber loop. Zener diodes are used to protect against voltage spikes due to lightning. U.S. Pat. No. 4,220,826 issued to Kiss discloses a ringing generator which is self-adjusting as to load current demands. It provides a high-efficiency generator with constant output signal wave form under a variety of load current levels. A feedback arrangement is used whereby the output signal at the ringing end is fed back to a comparator which compares the output signal with an oscillator-produced sine wave signal of ringing frequency. This comparison provides an error signal which is used to modulate the high frequency signal on a pulse with modulator, so as to change the duty cycle of the modulated signal thus, changing the relative energy contained in the signal.

U.S. Pat. No. 4,239,941 issued to Gauthier et al. discloses a single telephone ringing generator that can ring a plurality of connected ringers, each having a different frequency ring. By means of a clock counters in a sweep frequency oscillator, 32 different frequencies are generated. The sweep frequency signal is then current amplified and fed to a frequency programmable filter which wave shapes the signal into a sinusoidal signal. Then, the sinusoidal signal is amplified to ringing voltage level.

A number of problems have existed with prior art circuits. Some of the circuits are designed for ring-trip detection, but are not related to a ringing generator. The prior art circuits are either not adjustable, have no output regulation neither voltage nor current, or are expensive to manufacture.

The present invention overcomes these problems in the prior art and provides a novel sine wave ring generator.

SUMMARY OF THE INVENTION

This invention relates to a novel sine wave ring generator for use with a telephone circuit and an input voltage having a predetermined range, the generator comprises a switching power supply for providing a predetermined DC output voltage to the input voltage range, an oscillator for providing a pseudo-sine wave output with a predetermined frequency and an amplifier for amplifying the pseudo-sine wave and for receiving the predetermined DC voltage and having a low output impedance thereby maintaining regulation of a circuit output voltage in a predetermined range in supplying a circuit output current.

OBJECTS OF THE INVENTION

It is a primary object of the present invention to provide an improved sine wave ring generator circuit.

It is another object of the present invention to provide a ring generator circuit having output voltage regulation and current limiting.

It is a further object of the present invention to provide a ring generator circuit which is adjustable.

It is another object of the present invention to provide a ring generator which is inexpensive to manufacture.

It is also another object of the present invention to provide a ring generator circuit which has self-resetting current overload protection and low idle power consumption.

It is a further object of the present invention to provide a ring generator circuit which is compact in design.

BRIEF DESCRIPTION OF THE DRAWINGS

The features of the present invention which are believed to be novel are set forth with particularity in the appended claims. The invention, together with further objects and advantages, may best be understood by reference to the following description taken in conjunction with the accompanying drawings in the several figures of which like reference numerals identify like elements, and in which:

DESCRIPTION OF THE PREFERRED EMBODIMENT

Figure 1:
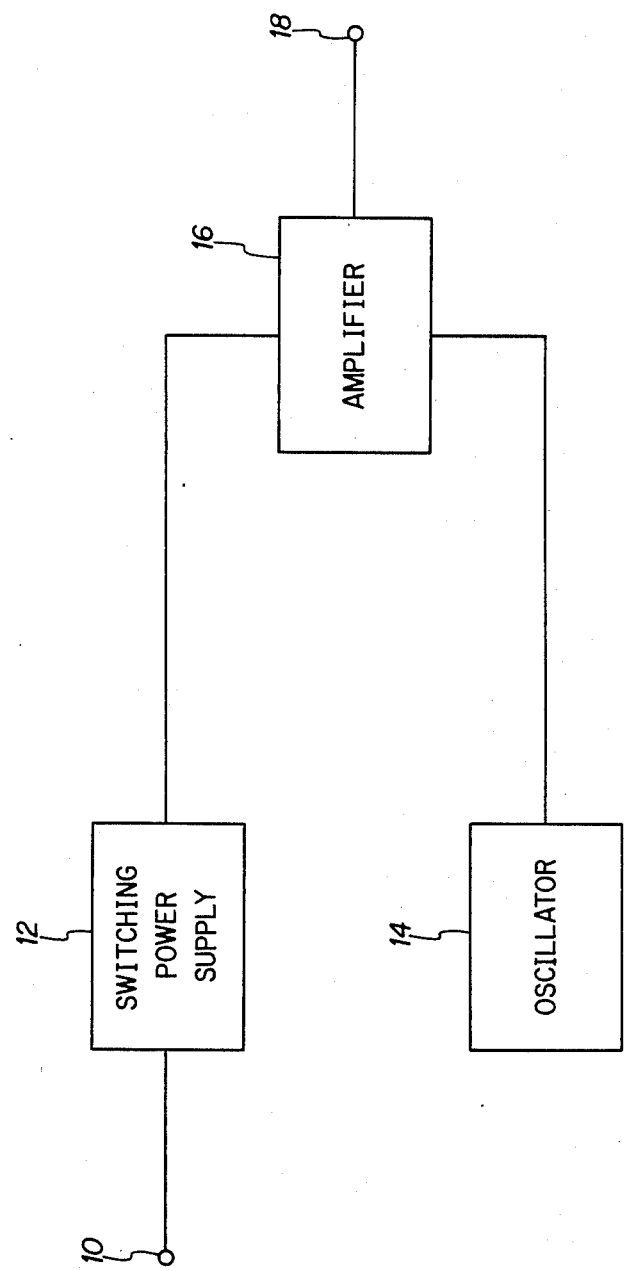
FIG. 1 is a block diagram of the novel ring generator.

The present invention is embodied in a circuit as shown in the general block diagram of FIG. 1. The novel sine wave ring generator receives an input voltage having a predetermined range on input terminal 10. A switching power supply 12 provides a predetermined DC output voltage from the input voltage range. An oscillator 14 provides a pseudo-sine wave output with a predetermined frequency of 20 Hz. An amplifier 16 amplifies the pseudo-sine wave and receives the predetermined DC voltage. The amplifier 16 has a low output impedance thereby maintaining regulation of a circuit output voltage on output terminal 18 in a predetermined range. The amplifier 16 supplies a circuit output current to the output terminal 18.

Figure 2:
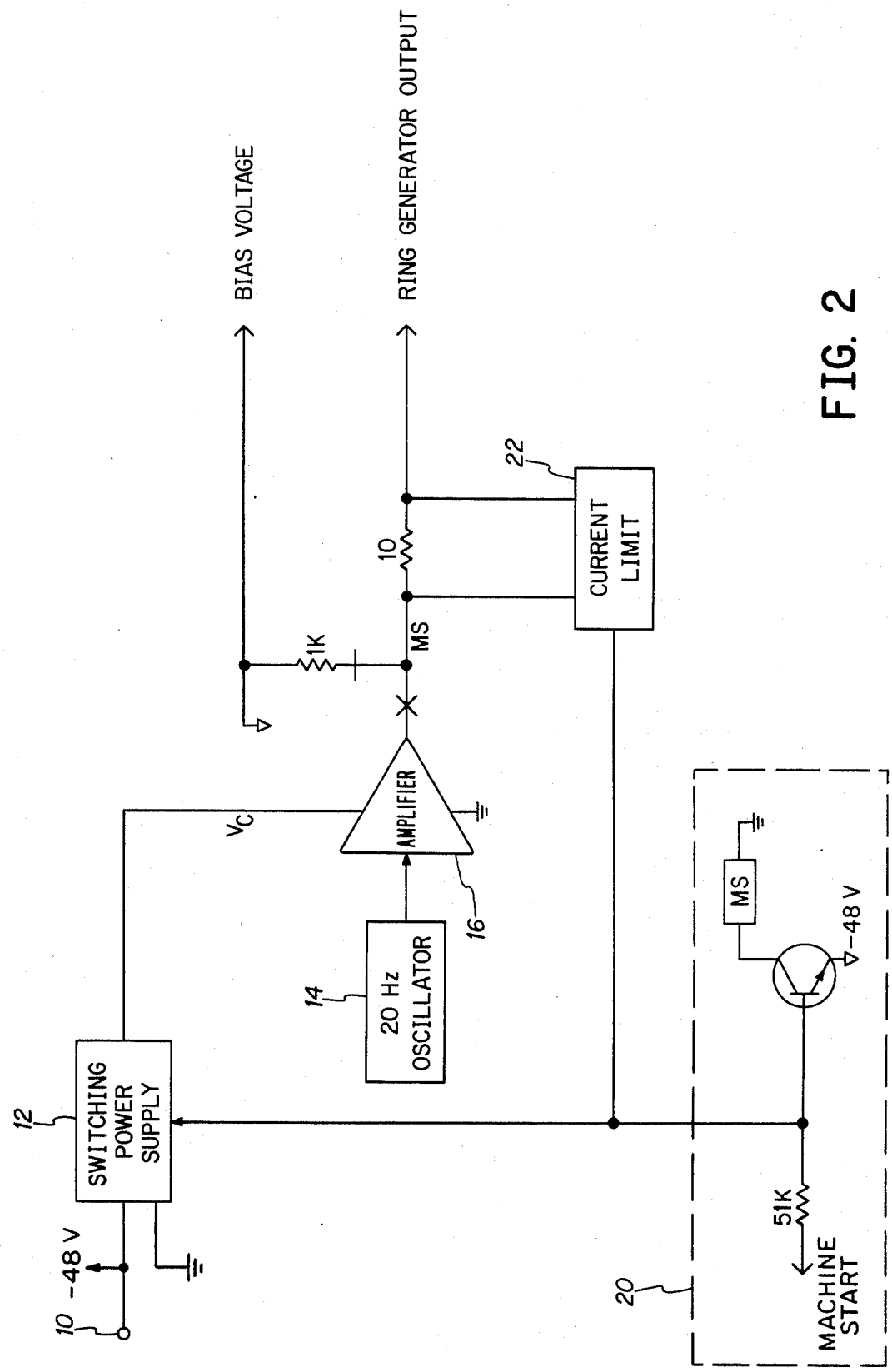
FIG. 2 is a more specific block diagram of the FIG. 1 block diagram.

As shown in FIG. 2, the sine wave ring generator also comprises a circuit 20 for regulating the switching power supply 12 and current limiting circuit 22 for limiting the circuit output current to a predetermined value when the enabling and disabling circuit 20 has enabled the power supply 12.

Figure 3:
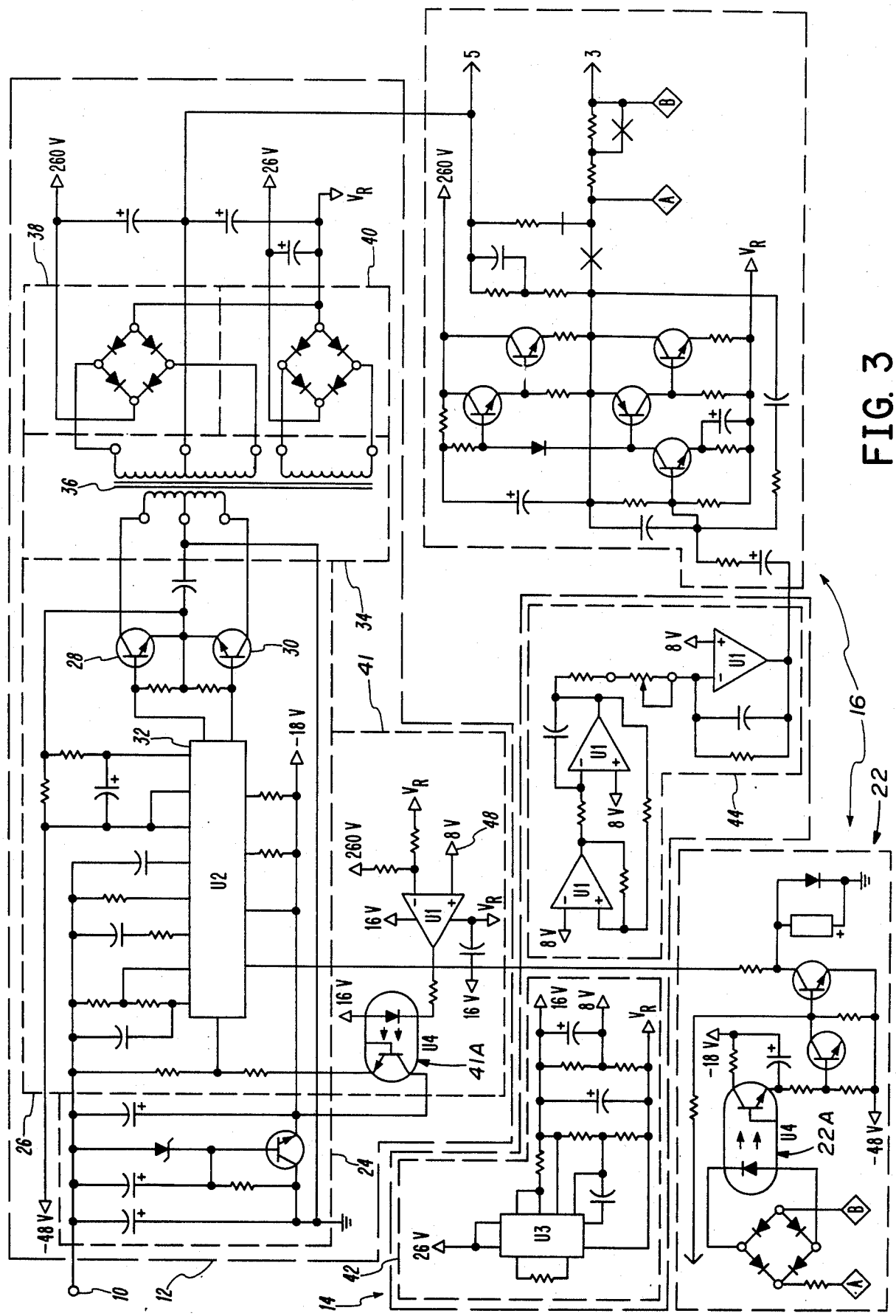
FIG. 3 is a circuit diagram of the ring generator.

Referring now to FIG. 3, the switching power supply 12 has a circuit 24 for receiving the input voltage from the input terminal 10. Circuit 26 provides for switching and is operatively connected to ciruit 24. Transistors 28 and 30 receive pulses from two square wave generators 32 that are 180° out of phase. Charge resonant transfer circuit 34 is transformer 36 and is operatively connected to the transistor 28 and 30 in the circuit 36, and creates a new voltage with one set of windings operatively connected to a voltage supply regulator means 39 to guarantee the output level of the oscillator 14. First and second rectifiers 38 and 40 are operatively connected to the charge resonant circuit 34 and output the predetermined DC output voltage.

A circuit for providing amplitude modulated power supply 41 is operatively connected to power supply 12. The circuit 41 enables the power supply 12 to supply voltage as needed. Circuit 41 provides regulation through amplitude modulation of the power supply 12 at approximately twice the oscillator frequency. Providing modulation through the optical coupler 41A of the circuit 41 provides isolation and allows the entire circuit to float.

The oscillator 14 consists of a triangular wave generator 42 and a filter circuit 44. The triangle wave generator 42 produces a triangle wave signal having a frequency of 20 Hz. The filter circuit 44 transforms the triangular wave into a pseudo-sine wave.

Amplifier 45 amplifies the pseudo-sine wave from the oscillator 42 and has a low output impedance. This low output impedance maintains regulation of the output voltage within the 4.0 volt range from no load to full load when the input voltage changes from −42 volts to −60 volts. The output is passed through a 10 ohm resistor 46 to provide current limiting. Thus, the output is AC and DC protected. When the switching power supply 12 is enabled by the enabling and disabling circuit 20 which is comprised of an optical coupler 22A the current limiting circuit 22 monitors the AC output current and does not let the amplifier supply current in excess of its rating. The disabling circuit 20 through use of an optical coupler 22A provides isolation for the amplifier 16 and allows the current limiting circuit 22 to monitor the AC output so that the amplifier 16 will not exceed supply current in excess of its rating while allowing the output of the amplifier to float. The current limiting circuit 22 will override the remote activation lead 48 in the enabling and disabling circuit 20 and then turn off the power supply 12 for a period of time. The current limiting circuit 22 will attempt to reactivate it and will repeat this attempt until the fault is removed or the remote activation is no longer attempting to activate the ring generator.

Because the sine wave generator floats, any one of a plurality of DC voltages may be applied to the bias lead which provides a DC potential that is superimposed on the AC signal to allow detection of ringing when the phone is answered.

The invention is not limited to the particular details of the apparatus depicted, and other modifications and applications are contemplated. Certain other changes may be made in the above described apparatus without departing from the true spirit and scope of the invention herein involved. It is intended therefore, that the subject matter in the above depiction shall be interpreted as illustrative and not in a limiting sense.

What is claimed is:

1. A sine wave ring generator for use with a telephone circuit and an input voltage having a predetermined range, said generator comprising:
    switching power supply means for providing a predetermined DC output voltage from said input voltage range;
    oscillator means for providing a pseudo-sine wave output with a predetermined frequency;
    amplifier means for amplifying said pseudo-sine wave and for receiving said predetermined DC voltage and having a low output impedance thereby maintaining regulation of a circuit output voltage and a predetermined range and supplying a circuit output current;
    a bias input operatively connected to the output of said amplifier means;
    means for enabling said disabling said switching power supply means operatively connected to said switching power supply means providing modulation through an optical coupler providing isolation of said power supply means and floating of said generator; and
    current limiting means having an optical coupler for providing isolating of said amplifier means and for limiting said output current to a predetermined value when said means for enabling and disabling has enabled said switching power supply means, whereby a plurality of DC voltages may be applied to said bias input.

2. The circuit described in claim 1 wherein said switching power supply comprises:
    means for receiving said input voltage;
    means for switching operatively connected to said means for receiving said input voltage;
    means for adjusting said means for switching to change pulse width;
    charge resonant transfer means operatively connected to said means for switching;
    first and second means for rectifying operatively connected to said charge resonant means and providing said predetermined DC output voltage.

3. The circuit described in claim 1 wherein said oscillator means comprises a triangle wave generator means for producing a triangular wave signal having a predetermined frequency and filter means for receiving said triangular wave and outputting said pseudo-sine wave.

4. The circuit described in claim 3, wherein said predetemined frequency of said triangle wave generating means is approximately 20 Hz.

5. A sine wave ring generator for use with a telephone circuit and input voltage having a predetermined range, said generator comprising:
    means for receiving said input voltage;
    means for switching operatively connected to said means for receiving said input voltage;
    means for enabling and disabling said switching power supply means operatively connected to said switching power supply means providing modulation through an optical coupler providing isolation of said power supply means and floating of said generator;
    charge resonant transfer means operatively connected to said means for switching;
    first and second means for rectifying operatively connected to said charge resonant means and providing a predetermined DC output voltage;
    triangle wave generator means for producing a triangular wave signal having a predetermined frequency;
    filter means for receiving said triangular wave and outputting a pseudo-sine wave; and
    amplifier means for amplifying said pseudo-sine wave and for receiving said predetermined DC voltage and supplying a circuit output current;
    a bias input operatively connected to the output of said amplifier means;
    current limiting means having an optical coupler for providing isolation of said amplifier means and for limiting said output current to a predetermined value when said means for enabling and disabling has enabled said switching power supply means, whereby a plurality of DC voltages may be applied to said bias input.

\* \* \* \* \*